United States Patent [19]

Ciampi et al.

[11] Patent Number: 4,504,158
[45] Date of Patent: Mar. 12, 1985

[54] POSITIONING DEVICE FOR A SELECTION MEMBER OF PRINTING MACHINES

[75] Inventors: Paolo Ciampi, Montalto Dora; Raffaele Becchi, Ivrea, both of Italy

[73] Assignee: Ing. C. Olivetti & C., S.p.A., Ivrea, Italy

[21] Appl. No.: 454,288

[22] Filed: Dec. 29, 1982

[30] Foreign Application Priority Data

Dec. 30, 1981 [IT] Italy .................. 68709 A/81

[51] Int. Cl.³ .................. B41J 1/30; H02K 7/06; G05B 11/18
[52] U.S. Cl. .................. 400/144.2; 310/83; 310/114; 318/593; 318/653; 400/320; 400/322
[58] Field of Search .................. 400/144.2, 144.3, 155, 400/163.1, 320, 322; 101/93.17–93.19; 318/653, 593; 310/114, 83

[56] References Cited

U.S. PATENT DOCUMENTS

| 3,651,916 | 3/1972 | Becchi | 400/144.3 |
| 3,701,104 | 10/1972 | Wiseman | 400/144.3 X |
| 4,264,220 | 4/1981 | Okcuoglu | 400/144.2 |
| 4,293,233 | 10/1981 | Hoffman | 400/144.2 |
| 4,349,770 | 9/1982 | Ragen | 400/144.2 X |
| 4,390,293 | 6/1983 | Gubau et al. | 400/144.2 |
| 4,440,512 | 4/1984 | Forcier | 400/144.2 |

Primary Examiner—Paul T. Sewell
Attorney, Agent, or Firm—Banner, Birch, McKie & Beckett

[57] ABSTRACT

Positioning device for a printer comprising a type carrier daisy wheel fitted on a carriage movable in front of the platen. The selection of type and movement of carriage are carried out by selection and transport motors of direct current type which are controlled by velocity servo motors through corresponding digital transducer and position counters. After a coarse positioning by the servo motor, the exact final position is reached and kept by exciting a couple of magnetic positioners whose rotor is keyed on the axes of the selection and transport motors.

Economic solutions are also described to synchronize, during initialization of the machine, the content of the position counters with the effective positions of the daisy wheel and carriage.

11 Claims, 10 Drawing Figures

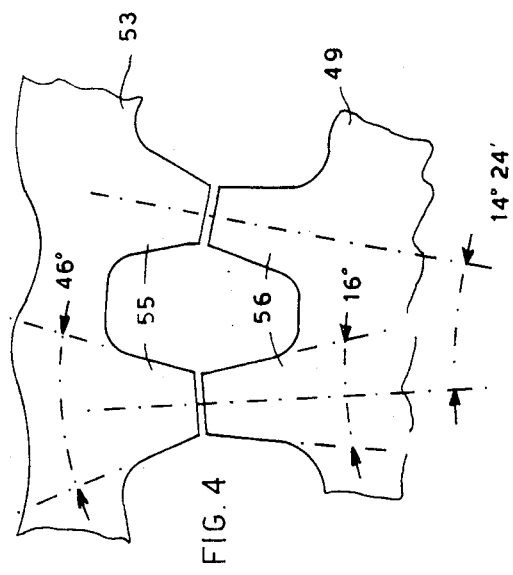
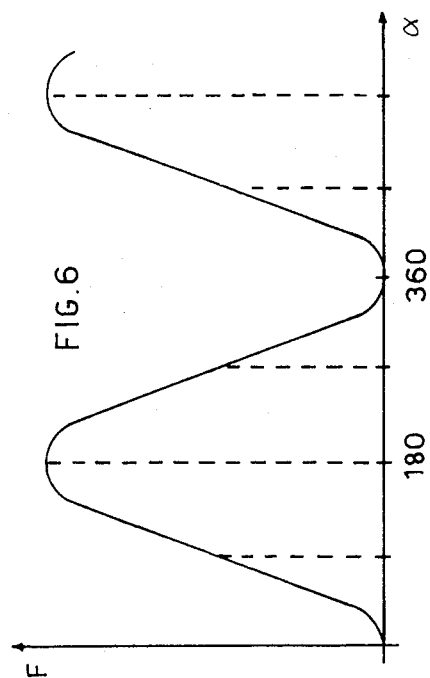
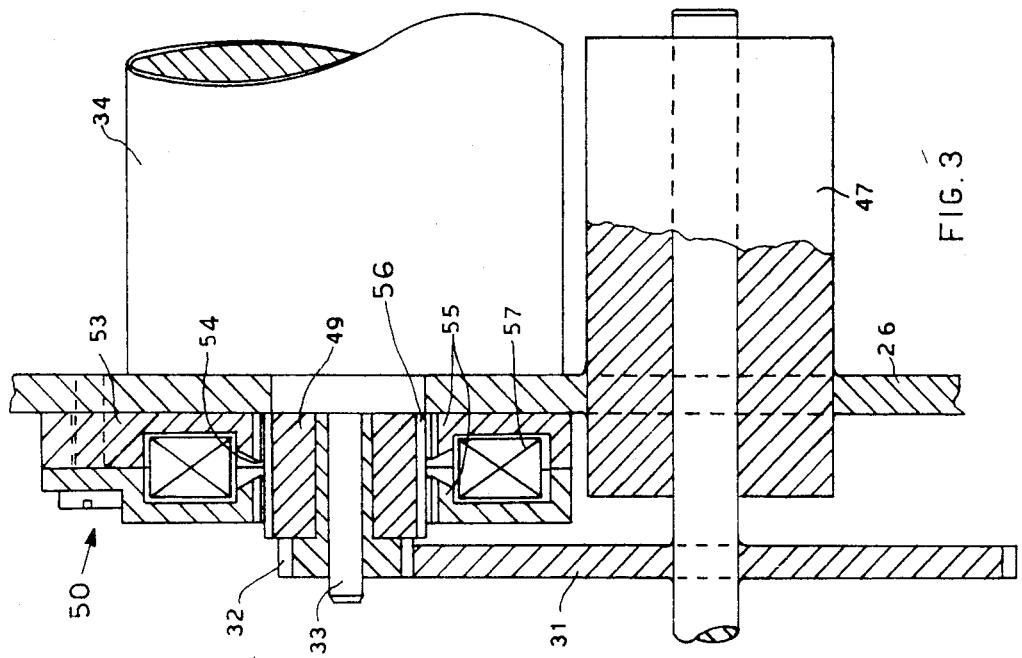

POSITIONING DEVICE FOR A SELECTION MEMBER OF PRINTING MACHINES

BACKGROUND OF THE INVENTION

The present invention is directed to a positioning device for a selection member of printing machines. The positioning device comprises a motor and a control circuit which carry out on said selection member displacements which are multiples of an elementary step. For instance, the displacements necessary to rotate a type carrier unit for positioning a type in front of a writing point, or displacements necessary for a carriage acting as support of the type carrier unit, may be carried out by the positioning device.

In some known devices, the positioning of these selection members is obtained through closed loop or open loop servomechanisms. Said mechanisms usually utilize a direct current motor controlled by feed back signals of position and/or speed transducers, or a stepping motor that can avoid the use of transducers. Both solutions are expensive. In one case, expense is incident to the high precision required for the transducer, which identifies the exact position and the speed of the rotor, in case of direct current motors. In the other case, expense is incident to the high intrinsic cost of stepping motors that should be utilized for the same purpose.

A first object of the present invention is to realize a positioning device for a selection member of printing machines which is exact, of low cost and which performs fast writing cycles.

Servomechanisms that discriminate only a coarse area near the desired position requested by the selection member have also been used. To these servomechanisms are coupled mechanical positioning devices, in order to correct the reached approximate position. Although the positioning devices are rather cheap, the cost of these realizations is still not acceptable in cheaper printing machines, due to the presence of all those mechanisms necessary to the operation of the mechanical positioner. Besides, these devices are not suitable for high speed printers owing to inertial delays associated with the mechanical positioner.

These disadvantages are solved by the positioning device of the invention, which comprises a coarse positioning detector for detecting elementary displacements of the selection member and a servomotor responsive to the information of the positioning detector to drive the selection member to a coarse position adjacent the requested position. The device further comprises a magnetic positioner having a movable part connected with the selection member and a control circuit for the magnetic positioner actuatable for putting said movable part into a position corresponding exactly to the requested position of said selection member.

The positioning device can be utilized for positioning a rotating member moved by a motor and connected with a piston transducer, including a rotating support having a series of position indicators equally spaced around the periphery of the support and a position detector for detecting the passage of the position indicators in front of a reference index. The signals of the position detectors are sent to an incremental counter to identify the angular position of the rotating member.

In known devices, on a rotating member associated with an incremental position counter, there is generally provided a synchronization detector that resets the content of the position counter when the detector detects the movement of a synchronization index in front of a reading station. The use of the second detector represents an additive cost and reduces the total reliability of the positioning device.

Another object of the invention is to reduce the cost of the means required to synchronize the content of a position counter with the position of a member to be positioned.

According to a first solution, the positioning device comprises a position indicator assymmetric as referred to the equally spaced indicators, a circuit that actuates the motor to rotate the rotating member according to a predetermined velocity, a time detector for detecting the times corresponding to the passage of the position indicators in front of the position detector, and means which load the position counter with a reference value when the time detector detects the passage of the assymmetric indicator, anomalous as referred to passages of equally spaced indicators.

According to a second solution, the positioning device is used on a printer including a type carrier unit of wheel or disk type and a carriage movable in front of the platen, a rotating selection member fitted on a carriage to select a character of said unit and a couple of counters, respectively for selection and transport, whose contents indicate the position of the selection member and the position of the carriage. The synchronization between selection counter and position of the selection member and between transport counter and position of the carriage is realized by a rotary index synchronous with the selection member and a translating index fitted on the carriage, and a single synchronizing transducer for the selection counter and the transport counter. This transducer is fixedly fitted referred to the printing line and is actuatable by the presence of the translating index, when the carriage is on a margin of the printing line, and by the presence of the rotary index, when the carriage is in a predetermined position of extra margin external to the printing line and said selection member is in a predetermined angular position. An initialization circuit moves the carriage towards said margin, independently of the content of the transport counter, till an activation of the synchronization transducer and a consequent synchronization of the transport counter. Successively, the circuit moves the carriage to its position of extra margin under the control of the transport counter and rotates the selection member, till a second actuation of the synchronization transducer and to a consequent synchronization of the selection counter.

BRIEF DESCRIPTION OF THE DRAWING

The above and other characteristics of the invention will become more apparent upon consideration of the following description, in conjunction with the drawing in which:

FIG. 3 is a sectioned detail in enlarged scale of a portion of the device of FIG. 1 taken along line III—III of FIG. 2.

FIG. 4 is a partial view of an enlarged part of the detail of FIG. 3.

FIG. 6 is a graph illustrating the operation of a part of the device of FIG. 1.

FIG. 8 is a detail of a variant of the device of FIG. 1.

DESCRIPTION OF THE PREFERRED EMBODIMENT

Figure 1:
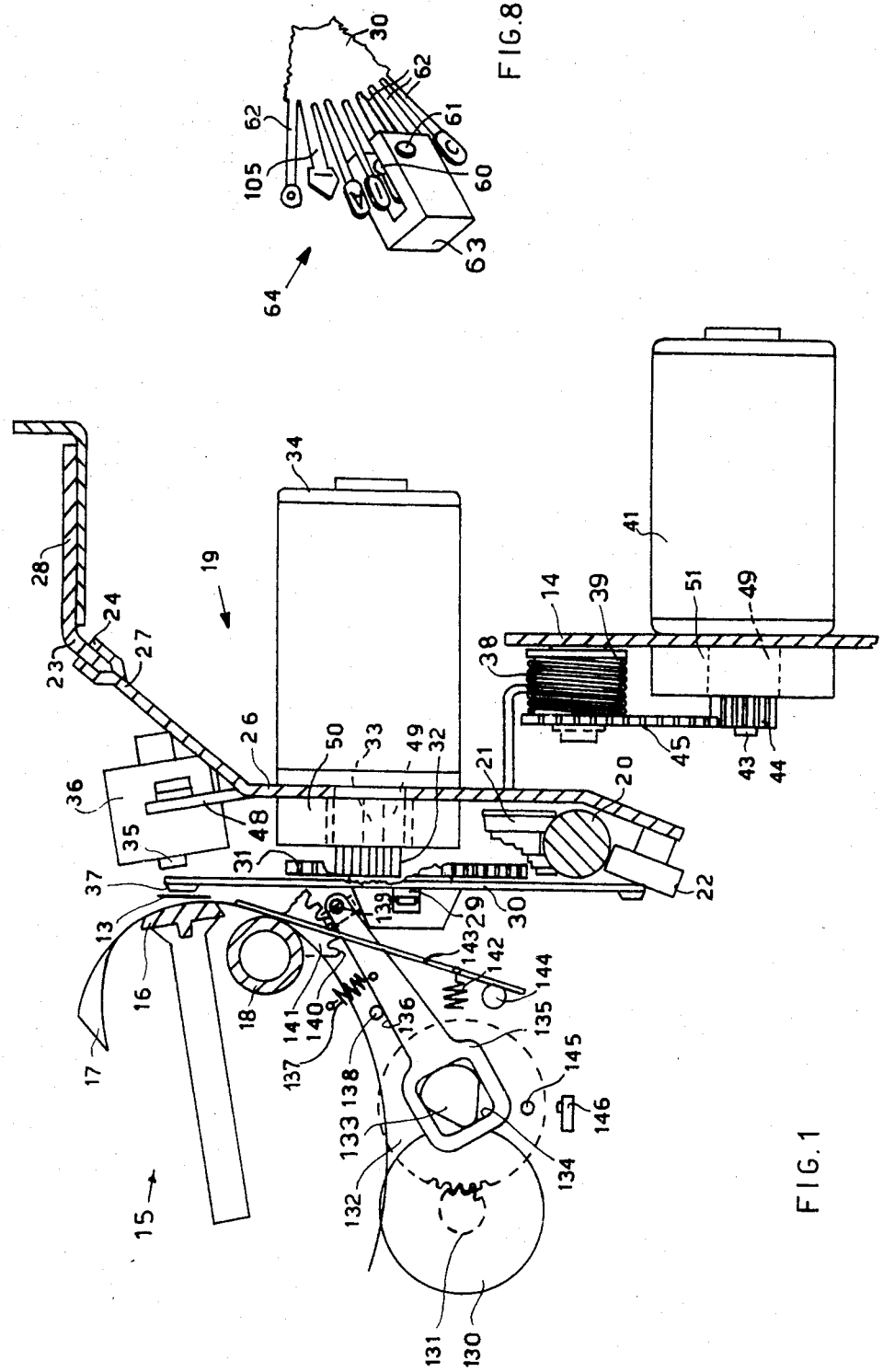
FIG. 1 is a schematic lateral view of the positioning device of the present invention.
Figure 2:
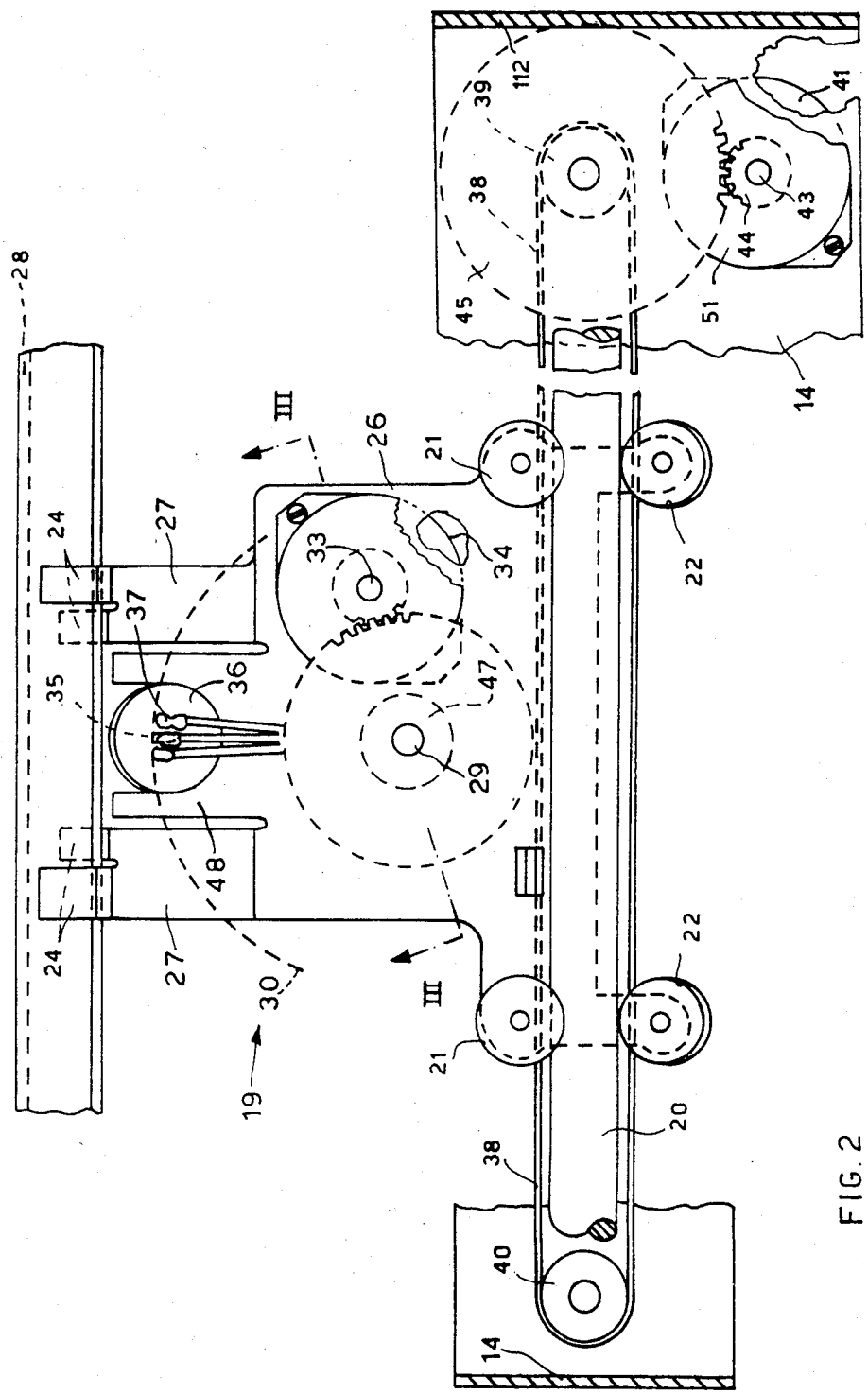
FIG. 2 is a frontal view of the device of FIG. 1.

The positioning device of the invention is herewith described in application to the control of type selection and carriage spacing of "daisy wheel" printers. However, it is evident that this device can be used advantageously also on printers of different type and/or for a single one of these controls. With reference to FIGS. 1 and 2, the device is used on a printer 15 comprising a frame 14, a support 16 for a sheet 17 and a carriage 19 movable parallel to the support 16. The carriage 19 includes a plate 26 substantially planar and vertical on the lowerpart of which are rotatably supported two wheels 21 and 22. These wheels 21 and 22 engage exactly a bar 20 parallel to the support 16 and determine the writing line of the printer 15. The plate 26 has two upper parts 27, sloping at 45° to the vertical, which are shaped in order to define two upper forks 24. The forks 24 engage slidably a sloping border 23 of a horizontal plate 28 and determine the distance of plate 26 from paper support 16.

On a bushing 47 of plate 26, is rotating a shaft 29 on which is fitted a removable type carrier unit 30 of "daisy" kind, described in the U.S. Pat. No. 3,983,985 assigned to Ing. C. Olivetti & C., S.p.A. On the shaft 29 is fixed a gear 31 which meshes with a pinion 32 keyed on the motor shaft 33 of a selection motor 34 of direct current type, fitted to overhang on plate 26. On upper part 48 of the plate 26 is fixed a print hammer 35 that can be actuated by an electromagnet 36 for the printing of a type 37 of the daisy 30 on sheet 17 through an inked ribbon 13.

The spacing movement of carriage 19 is obtained through a wire 38 having its ends fixed on the carriage 19. The wire 38 is partially wound around a drum 39 rotatably supported on a side of the frame 14 and around a pulley 40 supported on the opposite side of frame 14. The drum 39 is driven by a direct current spacing motor 41, fixed on frame 14. In particular on a motor shaft 43 of the motor 41 is keyed a pinion 44 which meshes with a gear 45 integral with the drum 39.

According to the invention, on each of the shafts 33, 43 of motor 34, 41 there is keyed a rotor 49 of an electromagnetic positioner 50, 51 to correct, the position of daisy 30 and of the carriage 19 defined by the corresponding motors 34 and 41. Each positioner 50 and 51 comprises a ferromagnetic stator 53 (FIGS. 3, 4) of toroidal form, defining internally an annular air gap 54 and twenty-five pole pieces 55. The rotor 49 is of ferromagnetic material and includes twenty-five pole pieces 56 which can oppose themselves to the pole pieces 55. The stator 53 is obtained from two half bearings of sintered iron coupled together in order to line up together the parts that form their own pole pieces 55. A winding 57 is arranged as a ring internally to the stator 53 in order to define a magnetic flux linked through the air gap 54 with the rotor 49 in changeable way depending upon the position of the same rotor 49 as regards to the stator 53. The width of pole pieces 55 and 56 is less than a half of their pitch. When the pole pieces 55 and 56 are phased together, that is facing each other, the reluctance of the magnetic circuit is minimum and the magnetic flux crosses in most part the pieces 56 and in least part the air gap 54. On the contrary, when the pole pieces 55 and 56 are phased 180° apart, the reluctance is at a maximum and a minimum part of magnetic flux crosses the rotor 49.

By using a daisy carrying one hundred types, the transmission ratio between the gear 32 and pinion 31 is 1 to 4. Therefore a displacement of pole pieces 56 through a full pitch as regards the pole pieces 55 of stator 53 corresponds to the passage of two adjacent characters 37 of daisy 30 as regards the hammer 35.

The diameter of drum 39 and the transmission ratio between the gear 45 and pinion 44 (FIG. 1) are so defined that a rotation of rotor 49 of positioner 51 through a full pitch corresponds to a linear movement of the carriage 19 through 1/60" with respect to the sheet support 16. In this way, movements through 1/12" or 1/10" of carriage 19 correspond to angular movements through 5 or 6 full pitches, respectively, of the rotor 49.

The angular position of daisy 30 (FIG. 5) and drum 39 can be detected without using special transducers. To this end, a magnetic field is generated on positioner 50, 51 either by a second winding situated inwardly of the stators 53 or by a permanent magnet, and the windings 57 detect the variations of magnetic flux of positioners 50, 51, as a consequence of periodic reluctance variations caused by their rotors. To have a better answer also in case of slow speed, the magnetic flux can be alternative as generated by a rather high frequency current on the second winding of the stators 53. The position signals are then determined by demodulating and suitably squaring the signals detected by winding 57 of positioners 50, 51, in rilevator circuits 58 and 59 in a manner known per se. An example of transducers of this type is described in the U.S. Pat. No. 3,559,064 incorporated herewith as reference.

Alternatively, other known and cheap position transducers 64, 65 can be used and fitted on motor shafts 34, 41 or on the member to be positioned. An example of transducers of this type is described in the U.S. Pat. No. 4,390,293 to Gubau et al assigned to the Ing. C. Olivetti & C., S.p.A. and incorporated herewith as reference.

In the case of the daisy 30, an optoelectronic transducer 64, shown in FIG. 8, can be used, including an illuminator 60 and a photovoltaic cell 61 fitted on a fork 63, on the opposite side as regards petals 62 of the daisy 30. The petals 62 have the same width and separation. The sequential passage of the various petals 62, shields the light that comes to cell 61 and gives an indicative signal of incremental rotation of the daisy 30.

Figure 5:
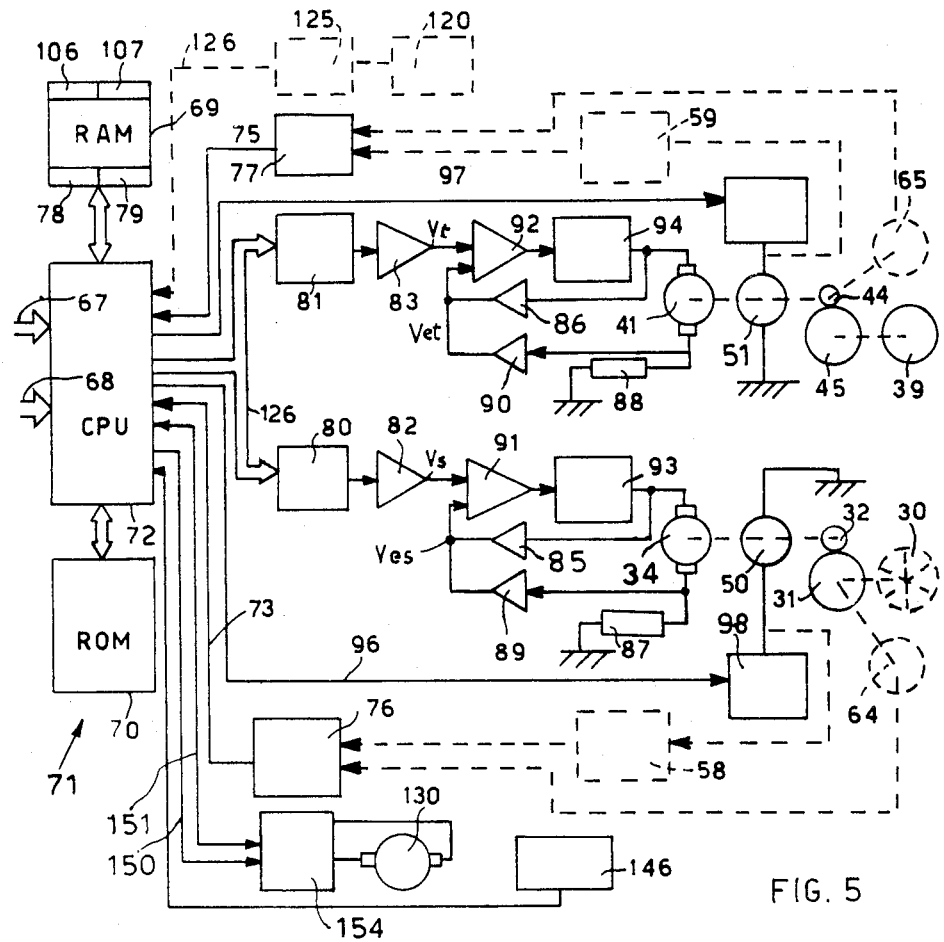
FIG. 5 is a block diagram of the control circuits of the positioning device according to the invention.

The circuit of FIG. 5 controls the speed and position of the motors 34 and 41 according to the position error of the members 30 and 39. This circuit includes a microprocessor 71 of known type including a central processing unit (CPU) 72 connected with a ROM 70 and a RAM 69, and which receives, as input, codes 67 and 68 of the desired position of the members 30, 39 and pulses 73, 75 associated with each incremental movement of said member. The pulses 73, 75, which come either from the position transducers 64, 65 or from the circuits 58 and 59, are processed in shaping circuits 76, 77 for being stored in suitable cells of RAM 69 operating as counters and represented by numerals 78 and 79. An example of microprocessor used to control the rotation of the daisy wheel and the movement of the carriage is described in the U.S. Pat. No. 4,324,499 to Giacone assigned to the Ing. C. Olivetti & C., S.p.A. and incorporated herewith as reference.

The counters 78 and 79 represent as alternative, the absolute position or the position error of the member to be positioned. In response to each received pulse 73, 75, the resulting calculated position error, and the microprograms of ROM 70, the microprocessor 71 furnishes an imposed velocity code in order to obtain the minimum positioning time according to the chosen motor and to the inertia of the parts to be moved. The velocity codes are converted to analoge form in corresponding circuits D/A 80 and 81. After amplification in amplifiers 82 and 83, the imposed velocity signals indicated as Vs, Vt are compared with corresponding feedback signals Ves and Vet representative of effective angular speeds of the motor shaft 33 and 43.

Figure 7:
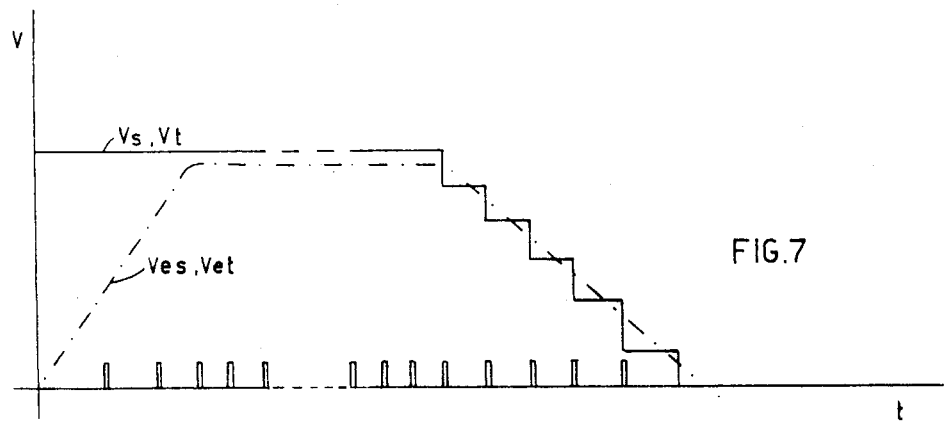
FIG. 7 is another graph illustrating the operation of another part of the device of FIG. 5.

The imposed velocity signals Vs, Vt, the feedback signals Ves, Vet, and the pulses 73 and 75, as functions of time are represented in FIG. 7. The imposed velocity is maintained at a maximum value till a deceleration area, where it is progressively reduced to zero when the selection member is in the requested position. The feedback signals Ves, Vet are taken, in a manner known per se, for instance by subtracting from the voltage of the motors 34 and 41 amplified in amplifiers 85 and 86, the voltage drop due to the internal resistance of motors 34 and 41. The voltage drop is derived from a resistor 87, 88 whose resistance is equal to the stator resistance of motor 34, 41 then amplified in an amplifier 89, 90.

The imposed velocity signals Vs, Vt and the feedback signals Ves, Vet are sent to comparators 91 and 92, the outputs of which feed driver circuits 93 and 94 for the selection motor 34 and the transport motor 41.

When the last pulse 73, 75 preceding the requested position of the selection member is received, the microprocessor 71 remarks a zero position error and causes the motor 34, 41 to be stopped. However the arrest position of the selection member 30, 39, can be included at any position lying between a full pitch of transducer 64, 65 to the right or to the left of the requested position. In fact, no error is remarked until the selection member is moved enough to give another pulse 73, 75. According to direction of movement, the maximum physical error could be equal up to two full pitches of the transducer 64, 65. Any physical position included between these limits is not recognized as error and is intrinsically indifferent. This kind of velocity servocontrol causes in fact a braking power which is opposed to any movement of the selection member in the limits of its uncertainty field, but cannot bring said member to any preferential position within the limits of a pitch.

According to the invention, the final position of the selection member is corrected by a magnetic positioner 50, 51 which reduces in a drastic way the uncertainty field of the servocontrol. When the last pulse 73, 75 is received, the microprocessor 71 furnishes a signal 96, 97 which is amplified in amplifier 98, 99 and actuates the winding of positioner 50, 51, stepping the rotor into a position of maximum stability.

As shown in FIG. 6, the positioning torque on the rotor of each positioner 50, 51, is very high in central positions and changes very fast around ±¼ of a full pitch. A stable position will be reached near this central position, allowing a position error acceptable for a good print quality.

In case that the position signal 73, 75 is derived from the winding 57 of the magnetic positioner 50, 51 the microprocessor 71 is programmed to omit any signal following the pulse required for braking.

The use of the transducer 64 of FIG. 8, allows to spare the optoelectronic couple for the initial synchronization between the content of the counter 78 of RAM 69 and the position of the motor shaft 33. To this end, a petal 105 of the daisy wheel 30, which carries the mark (−) and a reference index pointer, has a width which is twice the width of the other petals 62. The ROM 70 includes an initialization microprogram 86 which actuates the motor 41 for a rotation of the daisy 30 at a constant speed having a predetermined value and direction. After a period of time sufficient to the stabilization of the daisy speed, the microprogram tests the duration of the dimming signal of transducer 64. The digital measure of each dimming signal is stored in a storage area 106 of microprocessor 71 and compared with the duration of the former signal stored on a second storage area 107. If the duration of the new signal is once and a half as long as the duration of the former signal, the new signal is acknowledged as the synchronization signal which resets the content of the counter 78. This device, according to the large tolerances allowed, is insensitive to the eventual slow variations on the speed of motor 41.

According to a second change, the synchronization between the content of the counters 78 and 79 and the positions of daisy 30 (FIGS. 9, 10) and carriage 19 is solved by using a single transducer both for the daisy 30 and for the carriage 19. To this end, the printer comprises a magnetic transducer 110 fixed on the left side 112 through a shelf 118 and including a Hall detector 120 fixed in front of a permanent magnet 121. The carriage 19 and the shaft 29 are both supplied with a blade screen 122, 123 which can be inserted between the magnet 121 and the detector 120, screening the magnetic flux that normally crosses the detector 120. The reciprocal positions of different parts are done so that the interruption of the magnetic flux by the blade screen 122 of the carriage takes place on the first position of the printing line 114 of carriage 19, while the trajectory of the blade screen 123 is external to the detector 120 during movements of carriage in front of the printing line 114.

Figure 9:
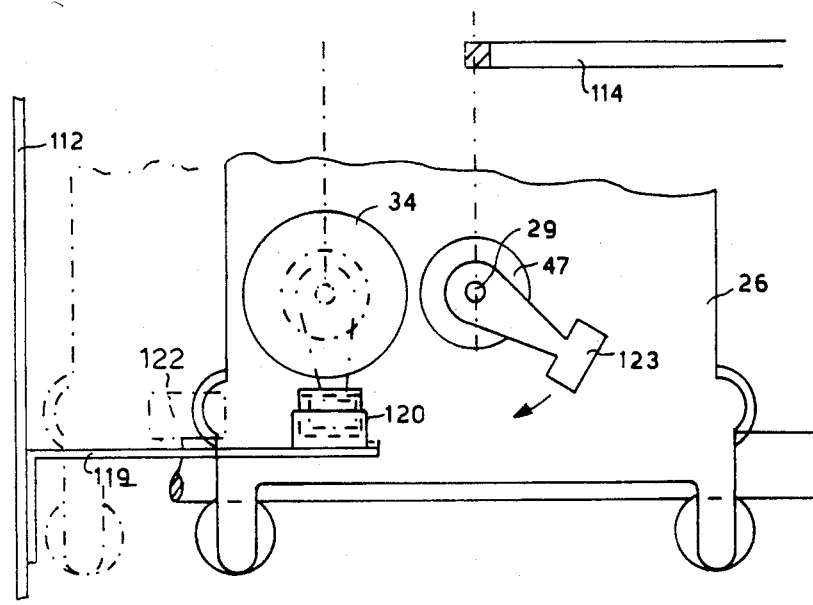
FIG. 9 is a back schematic view of another variant of the device of FIG. 1.
Figure 10:
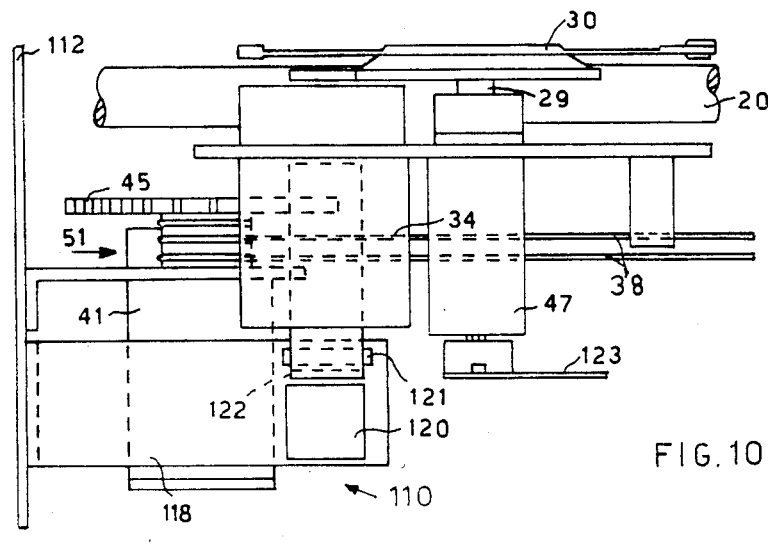
FIG. 10 is a plan view of the variant of FIG. 9.

The ROM 70 provides an initialization program which causes a preliminary reset of the RAM 107 and a following drive to the motor 41 to rotate the shaft 43 at a constant low velocity not depending upon counter 79 indication. The ordered direction of rotation causes the carriage 19 to be moved towards the left side 112, till the blade 122 is positioned in front of the Hall detector 120 and screens the magnetic flux. That causes the actuation of a circuit 125 (FIG. 5), which sends to the microprocessor 71 a pulse 126 for resetting the counter 79. The microprocessor 71 now actuates the motor 41 for moving again the carriage 19 (FIG. 12) towards the side 112 externally to the printing line, by counting a number of pulses 75 sufficient to bring the path of screen 123 to be included between the magnet 122 and the detector 120. The microprocessor arrests the motor 41 and then actuates the motor 34 for rotating the shaft 31 in a predetermined direction. The new pulse 126, which is generated by the passage of the screen 123 in front of the detector 120, shown as dot and line in FIG. 9, is used to reset the counter 78. The microprogram 71 finally completes the initialization of the printer by bringing again the carriage 19 in front of the printing line.

The printer 15 (FIG. 1) includes a line spacing mechanism, which includes a motor 130, on the rotor of which is keyed a pinion 131 in mesh with a gear 132. On this gear 132 is fixed a three lobed eccentric 133 which is engaged in a square slot 134 of a connecting rod 135. The connecting rod 135, through a spring 137, holds a lateral shoulder 136 normally resting on a fixed pin 138. A pin 139 is fixed on the end of the connecting rod 135 in order to engage one of a series of notches 140 which are equally spaced around the periphery of a gear 141 keyed on the axis of the roller 18. The roller 18 is held at rest by a positioner not shown and the sheet 17 is held in contact with roller 18 through a spring 142 and through a lamina 143 turning on an axis 144.

In its rest position, the pin 139 is disengaged from the gear 141, is at its upper dead center and is placed in front of any reference notch of the notches 140. On the gear 132 is fixed a magnetic block 145 which is normally positioned in front of a magnetic detector 146 which now holds the detector 146 normally actuated.

For actuating a spacing movement of the sheet 17, the microprocessor 71 (FIG. 5) actuates the motor 130 through two lines 150 and 151 and an amplifier 154 according to a predetermined sense of direction till the detector 146 detects that the gear 132 has performed a full rotation. The direction of motion ordered to the motor will depend on the direction of movement requested for the sheet 17. The rotation of the pin 133 and the consequent rotation of the gear 132 and the eccentric 133 causes a translation and rotation movement of the connecting rod 135, limited by the pin 138, which causes the pin 139 to follow a substantially square trajectory, indicated with a dotted line in FIG. 1.

In case of a clockwise rotation of the pinion 131, the pin 139 goes ulteriorly away from the notch 140, goes to its lower dead center and engages the notch which procedes the reference notch causing a counterclockwise step rotation of the roller 18. Thereafter, the pin 139 releases the notch 140 and comes again into its rest position. In case of a counterclockwise rotation of the pinion 131, the pin 139 engages first the reference notch and releases it after a step clockwise rotation of the roller 18. The requested movement of sheet 17 will be determined by the number of cycles carried out by the mechanism 129.

The profiles of maximum and minimum lift of the eccentric 133 have a section substantially circular. It ensures that also rather large errors in the reference position of the block 145 as regards the detector 146 have no effect on the final position of the roller 18. In fact, a large error in the reference position of the gear has the only effect of modifying the distance of the pin 139 from the reference notch 140.

What is claimed is:

1. A positioning device for a selection member of a printing machine comprising:
   detector means responsive to the movement of said selection member for generating position pulses indicative of given positions of said selection member;
   a magnetic positioner provided with a stator, a rotor connected for rotation with said selection member and an energizable winding for positioning said rotor into a plurality of stable positions with respect to said stator, wherein the stable positions of said rotor are univocally associated with the given positions of said selection member;
   servomotor means including motor means energizable for moving said selection member and control means responsive to the position pulses of said detector means for energizing said motor means until the selection member is moved to an area relative to a desired position of said given positions and then energizing said energizable winding for causing the rotor of said magnetic positioner to be positioned in one of said stable positions in order to position said selection member closely to the desired position of said plurality of given positions.

2. Positioning device according to claim 1, further comprising velocity detecting means coupled to said selection member for generating a velocity signal indicative of the velocity of said selection member, wherein said control means is coupled with said velocity detecting means for energizing said motor means according to said velocity signal and wherein said control means respond to a last pulse of said position pulses preceding the desired position to arrest said motor means when the selection member has reached the area relative to the desired position.

3. Positioning device according to claim 1, wherein the printing machine comprises a platen and a carriage carrying a type-carrier wheel and wherein said selection member comprises a drive shaft for moving the carriage transversely with respect to said platen, wherein said given positions are represented by printing positions of said carriage along the platen, and wherein the stable positions of said rotor are univocally associated with the printing positions of said carriage.

4. Positioning device according to claim 3, wherein said motor means rotates said driving shaft through a speed reducer mechanism and wherein the rotor of said magnetic positioner is synchronous with said motor means.

5. Positioning device according to claim 1, wherein said selection member rotates a type-carrier wheel through a speed reducer mechanism, wherein the rotor of said magnetic positioner is keyed on said selection member and wherein the stable positions of said rotor are univocally associated with predetermined angular positions of the type-carrier wheel.

6. Positioning device according to claim 5, wherein the speed reducer mechanism comprises a driving shaft fixing a gear member, wherein said selection member includes a motor shaft having a pinion engaged with said gear member and wherein the rotor of said magnetic positioner is keyed on said motor shaft.

7. Positioning device according to claim 1, wherein the stator of said magnetic positioner comprises a ferromagnetic circuit of toroidal shape including two internal edges faced to define a gap therebetween, wherein said edges are configured to define two pluralities of axial teeth aligned and faced therebetween, wherein said energizable winding is located internally to said ferromagnetic circuit and is energizable to generate a magnetic flux which crosses principally the gap between the axial teeth, and wherein said rotor includes a plurality of teeth of ferromagnetic material which can be positioned opposite to face the teeth of said ferromagnetic circuit.

8. Positioning device according to claim 7, wherein said selection member rotates a type-carrier daisy wheel through a speed reducer mechanism, wherein said type-carrier daisy wheel is provided with one hundred types, wherein the speed reduction ratio between the selection member and the type-carrier daisy wheel is four to one and wherein the teeth of said ferromagnetic circuit and said rotor are twenty-five in number.

9. In a positioning device for a rotary member moved by a motor comprising a position transducer having a movable part connected with the rotary member; a detector mounted at a fixed position; a series of position indicators carried by said movable part, wherein each position indicator causes said detector to generate an electrical signal when said indicator is in front of said detector, and wherein the length of said signal is proportional to the length of time during which said position indicator is in front of said detector; memory means coupled with said detector and responsive to said signals to represent the position of said rotary member; and synchronizing means for actuating said motor to rotate the selection member at a constant velocity and for synchronizing the content of said memory means with a reference position of said rotary member, wherein said synchronizing means comprise:

- time detector means for detecting the length of time of said signal, wherein all the position indicators except one of said series of position indicators have the same transverse dimension and one reference position indicator has a transverse dimension different from the transverse dimensions of all the other position indicators; and
- storing means for storing two consecutive lengths of time of said signal, and wherein said synchronizing means respond to a given difference of time between the stored length of time of said storing means to synchronize said memory means with a reference position of said rotary member.

10. A positioning device according to claim 9, wherein all said position indicators except one comprise the petals of a type-carrier daisy wheel, wherein said detector includes all illuminator and a photodetector element fitted on opposite sides of said type-carrier daisy wheel and wherein said photodetector element generates said signal in response to the passage of said petals between said illuminator and said photodetector element and wherein said one reference position indicator comprises a petal larger than the other petals.

11. In a positioning device for a printer comprising a platen defining a printing line; a carriage movable in front of said platen and rotatably supporting a type wheel; a type wheel driving member carried by said carriage and actuatable for rotating said type wheel to select a type of said type wheel; a carriage driving member for moving the carriage in front of said platen; a type wheel transducer responsive to incremental rotations of the type wheel member for generting corresponding wheel pulses; wheel memory means responsive to said wheel pulses to represent the angular position of the type wheel; a carriage transducer responsive to incremental movements of said carriage for generating corresponding carriage pulses; carriage memory means responsive to said carriage pulses to represent the carriage position with respect to the platen; initialization means for positioning said carriage at one reference position with respect to said platen and said type wheel at a reference angular position; and synchronization mean for synchronizing the content of the wheel memory means and the angular position of the type wheel at said one reference angular position and for synchronizing the content of the carriage memory means and the position of said carriage at said one reference position, the combination comprising:

- a wheel index for rotating synchronously with the type wheel;
- a carriage index fitted on the carriage; and
- a single detector fixedly mounted with respect to the printing line and actuatable by the carriage index when the carriage is at said one reference position and wherein said detector is also actuatable by said rotary index when the carriage is in another reference position beyond said one reference position to the external of the printing line and when said type wheel is at said reference angular position; and
- means responsive to actuation of said detector to synchronize the content of said carriage memory means with the reference carriage position and the content of said wheel memory with the reference angular position of said type wheel;

wherein said initialization means first moves the carriage into said one reference position whereby causing the carriage index to actuate said detector for the synchronization of said carriage memory means with said one reference position, then moves the carriage into said other reference position under the control of said carriage memory means and then actuates said type wheel driving member for continuously rotating said type wheel independently of the content of said wheel memory means until said wheel index actuates said detector to synchronize the wheel memory means with the reference angular position of said type wheel.

* * * * *